Patented July 7, 1931

1,813,665

UNITED STATES PATENT OFFICE

PAUL C. SEEL, WILLIAM R. WEBB, AND JOHN M. DONOHUE, OF ROCHESTER, NEW YORK, ASSIGNORS TO EASTMAN KODAK COMPANY, OF ROCHESTER, NEW YORK, A CORPORATION OF NEW YORK

PROCESS OF MAKING CELLULOSE ETHERS

No Drawing. Application filed May 11, 1921. Serial No. 468,756.

This invention relates to the manufacture of cellulose alkali cellulose, as a step in making ethers. One object of the invention is to provide a process which yields cellulose ethers out of which may be produced strong, flexible, transparent sheets or films such as may be used in photography, for example, and at the same time to simplify such process so as to eliminate or reduce expensive preliminary treatments of the cellulose. Another object of our invention is to provide an improved process in which certain ingredients are added separately to the cellulose. Still another object of our invention is to provide a process in which the separately added ingredients are directly added in approximately the amounts that it is advisable to have present during the etherifying reaction. Other objects will hereinafter appear.

It has been proposed to make cellulose ethers by reacting on an intimate mixture of cellulose and alkali (termed "alkali cellulose" in the art) with an etherifying agent, small amounts of water being present. But it was suggested that the cellulose be treated with an excess of alkaline solution and subsequently removing a considerable portion thereof, e. g. by pressing, in order to obtain the desired preliminary mixture. We have found that it is desirable to add the water and alkali separately and in the desired amounts directly to the cellulose.

Moreover, in the previously suggested method, where a solution was used to carry the alkali into the cellulose, an amount of solution was employed containing either alkali or water, or both, far in excess of the amounts desired for the etherifying reaction. The removal of the excess has been found to be expensive. Mechanical pressing of some of the excess solution from the cellulose does not remove enough water (in cases where alkali cellulose of very low water content is desired), so that an evaporating or drying method has also to be used. Both the mechanical pressing and the drying operation, especially if the latter is performed in a vacuum, are expensive. We have found that this expense can be avoided by adding the water and alkali separately to the cellulose in amounts approximating those required during the etherification.

We will now give one example of our invention, but it will be obvious that the proportions may be varied and the steps otherwise altered so long as the water and alkali are added separately to the cellulose, or so long as the quantities of water and alkali are approximately those best suited for the etherifying reaction. We may, for example, moisten 100 parts by weight of cellulose, preferably in the form of wood pulp or prepared cotton, like linters, with 50 parts of water. Then the moistened cellulose is very intimately mixed with 200 parts of dry caustic soda. We prefer to carry out the mixing step by the use of the disintegrating impact process set forth in the application of Paul C. Seel, Serial No. 458,748, filed Apr. 5, 1921, but, of course, an equivalent or suitable method may be substituted.

In an alternative form of our invention 200 parts by weight of dry caustic soda may be mixed with 100 parts of cellulose and then the quantity of water, predetermined for the ethylating reaction, may be separately added to the alkali and cellulose mixture, the whole being intimately mixed in any suitable way, such as by the above mentioned Seel process.

Our process eliminates the treatment of the cellulose with a caustic solution and the subsequent pressing out and evaporating of the excess. It permits the use of low percentages of water in proportion to the cellulose present, this being highly desirable in the case of etherification when very small amounts of water, such as the theoretical or slightly higher percentages of the etherifying reagent are to be used. Also a superior mixture of the alkali with the cellulose is obtained.

The intimate mixture of cellulose, water, and sodium hydroxid obtained in either of the hereinabove given examples may, by way of illustration, be charged into an autoclave with 400 parts by weight of ethyl chloride for each 100 parts of cellulose in the mixture. The autoclave is then heated for say twenty-four hours at temperatures between 90 and 170° C., the contents being agitated if necessary. The resulting ethers of cellulose are substantially insoluble in water and are of the high quality necessary for the production of transparent compositions which may be employed in film and varnish making and the other plastic arts.

In the hereinabove given illustrations the alkali and water are added separately to the cellulose in the preferred form of our invention. This separate addition is made at different times, but it is within the scope of our invention to add these ingredients at the same time to the cellulose, but separately, say, to different parts in the mass, which is then treated by the Seel process to obtain the intimate admixture.

Having thus described our invention, what we claim as new and desire to secure by Letters Patent is:

The herein described process of making cellulose ethers which comprises first preparing alkali cellulose by adding to a given weight of cellulose, only that amount of water which is to remain in the alkali cellulose, which amount of water is substantially less than the amount of the cellulose, and separately therefrom adding only the amount of caustic alkali which is to remain in the alkali cellulose, which amount of caustic alkali is substantially greater than the amount of cellulose, and thereafter mechanically working the mixture into a uniform mass, the said addition of water and alkali being in any order, and thereafter subjecting such alkali cellulose to action of an etherifying agent, at a temperature between about 90 and 170° C.

Signed at Rochester, New York, this 4th day of May, 1921.

JOHN M. DONOHUE.
WILLIAM R. WEBB.
PAUL C. SEEL.